US009140936B2

(12) United States Patent
Xie

(10) Patent No.: US 9,140,936 B2
(45) Date of Patent: Sep. 22, 2015

(54) BLUE PHASE LIQUID CRYSTAL PANEL AND DISPLAY DEVICE

(71) Applicant: BOE TECHNOLOGY GROUP CO., LTD., Beijing (CN)

(72) Inventor: Chang Xie, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/127,190

(22) PCT Filed: Oct. 11, 2012

(86) PCT No.: PCT/CN2012/082805
§ 371 (c)(1),
(2) Date: Dec. 18, 2013

(87) PCT Pub. No.: WO2014/015565
PCT Pub. Date: Jan. 30, 2014

(65) Prior Publication Data
US 2014/0307206 A1   Oct. 16, 2014

(30) Foreign Application Priority Data

Jul. 27, 2012   (CN) .......................... 2012 1 0265620

(51) Int. Cl.
*G02F 1/1343*   (2006.01)
*G02F 1/139*    (2006.01)
(Continued)

(52) U.S. Cl.
CPC .... *G02F 1/134309* (2013.01); *G02F 1/133555* (2013.01); *G02F 1/134363* (2013.01); *G02F 2001/13793* (2013.01); *G02F 2201/123* (2013.01)

(58) Field of Classification Search
CPC ................... G02F 1/133555; G02F 1/134309; G02F 2001/13793; G02F 1/134363
USPC .................... 349/114, 119, 141, 167, 169, 48
See application file for complete search history.

(56) References Cited

U.S. PATENT DOCUMENTS 7,768,589 B2 *   8/2010   Miyachi et al. .................. 349/41
2006/0164575 A1 *   7/2006   Su et al. ......................... 349/114
(Continued)

FOREIGN PATENT DOCUMENTS

| CN | 101174069 A | 5/2008 |
|----|-------------|--------|
| CN | 101359118   | 2/2009 |

(Continued)

OTHER PUBLICATIONS

Second Chinese Office Action Appln. No. 201210265620.9; Dated Oct. 23, 2014.
(Continued)

*Primary Examiner* — Dung Nguyen
*Assistant Examiner* — Tai Duong
(74) *Attorney, Agent, or Firm* — Ladas & Parry LLP

(57) ABSTRACT

A blue phase liquid crystal panel and a display device provide a transflective mode blue phase liquid crystal panel with a single cell gap so as to simplify the process. The blue phase liquid crystal panel comprises: a first substrate and a second substrate that are disposed opposite to each other so as to form a liquid crystal cell; a blue phase liquid crystal layer between the two substrates; gate lines and data lines arranged to intersect the gate lines to define pixel regions on an inner side of the first substrate. The blue phase liquid crystal panel has a single cell gap, and the pixel regions are divided into transmission regions and reflection regions. The light for display in the transmission region and the light for display in the reflection region of a same pixel region generate the same phase retardation after passing through the blue phase liquid crystal layer.

8 Claims, 8 Drawing Sheets

(51) Int. Cl.
*G02F 1/1335* (2006.01)
*G02F 1/137* (2006.01)

(56) References Cited

U.S. PATENT DOCUMENTS

| | | | |
|---|---|---|---|
| 2008/0002079 A1* | 1/2008 | Kimura | 349/42 |
| 2008/0100764 A1 | 5/2008 | Haruyama | |
| 2009/0284693 A1 | 11/2009 | Adachi et al. | |
| 2010/0053490 A1* | 3/2010 | Kang et al. | 349/48 |
| 2011/0141410 A1* | 6/2011 | Hsiao et al. | 349/98 |
| 2011/0170040 A1* | 7/2011 | Park et al. | 349/96 |

FOREIGN PATENT DOCUMENTS

| | | |
|---|---|---|
| CN | 101398574 A | 4/2009 |
| CN | 102012588 A | 4/2011 |
| CN | 102654680 A * | 9/2012 |
| CN | 202693962 U | 1/2013 |
| TW | 594630 B | 6/2004 |

OTHER PUBLICATIONS

Yan Li et al. "Transflective display using a polymer-stabilized blue-phase liquid crystal", Optics Express, vol. 18 No. 16 pp. 16486-16491; Published Jul. 21, 2010.
International Search Report Dated Apr. 24, 2013; PCT/CN2012/082805.
First Chinese Office Action Dated May 6, 2014 Appln. No. 201210256520.9.
International Preliminary Report on Patentability dated Jan. 27, 2015; PCT/CN2012/082805.
Third Chinese Office Action dated Apr. 3, 2015; Appln. No. 201210265620.9.

* cited by examiner

BLUE PHASE LIQUID CRYSTAL PANEL AND DISPLAY DEVICE

TECHNICAL FIELD

Embodiments of the present invention relate to a transflective mode blue phase liquid crystal panel and a display device.

BACKGROUND

According to the light sources employed for display, liquid crystal display devices can be categorized into a transmissive mode, a reflective mode, and a transflective mode. Sharing the advantages of the transmissive mode and the reflective mode liquid crystal display devices, the transflective mode liquid crystal display devices have been widely used in the display apparatuses of electronic products.

In order to improve the display quality of liquid crystal display and realize a higher contrast ratio, quicker response duration, and a wider viewing angle, blue phase liquid crystal materials having quick response characteristics have gradually attracted more and more attention. Blue phase is a liquid crystal phase that is between the isotropic phase and the cholesteric phase, and it exists in a very narrow window of temperature, e.g., about 1=C. But, it has been found in the recent years that the blue phase liquid crystal subjected to stabilization with polymers can exist in a much wider window of temperature, which can basically satisfy the requirement for serving as a liquid crystal display material.

Being the next generation display with greatest potential, the blue phase liquid crystal display has the following characteristics: (1) it has a wide viewing angle and a good display effect in a dark state; (2) it has very short theoretical response time, which may reach the level less than millisecond; (3) it does not need any alignment layer required by other liquid crystal displays, which can lower the production costs and simplify the manufacturing process.

However, the current transflective mode blue phase liquid crystal display usually adopts a double cell-gap structure to achieve consistent phase retardation in the transmission region and the reflection region, but there are greater difficulties in manufacturing the display with the double cell-gap structure.

SUMMARY

The embodiments of the present invention provide a blue phase liquid crystal panel and a display device, for providing a transflective mode blue phase liquid crystal panel with a single cell gap so as to simplify the process.

One aspect of the present invention provides a blue phase liquid crystal panel, comprising: a first substrate and a second substrate that are disposed opposite to each other so as to form a liquid crystal cell; a blue phase liquid crystal layer between the two substrates; a gate line and a data line arranged to intersect the gate line to define a pixel region on an inner side of the first substrate; and stripe-shaped electrodes located in the pixel region defined by the gate line and the data line. The blue phase liquid crystal panel has a single cell gap, and the pixel region is divided into a transmission region and a reflection region; a distance between the adjacent stripe-shaped electrodes in the transmission region is smaller than a distance between the adjacent stripe-shaped electrodes in the reflection region in the same layer, such that the light for display in the transmission region and the light for display in the reflection region of a same pixel region generate the same phase retardation after passing through the blue phase liquid crystal layer.

For example, the blue phase liquid crystal panel further comprises: a first quarter wave plate, a first half wave plate, and a first polarizer disposed on an outer side of the first substrate; and a second quarter wave plate, a second half wave plate and a second polarizer disposed on an outer side of the second substrate.

For example, in the reflection region, a reflective layer is disposed on an inner side of the first substrate, and an insulating layer is disposed on the reflective layer, the insulating layer extending in both the transmission region and the reflection region.

For example, a thickness of the insulating layer in the transmission region is greater than a thickness of the insulating layer in the reflection region, and difference between the thicknesses of the insulating layer in the two regions is equal to the thickness of the reflective layer.

For example, the stripe-shaped electrodes in the pixel region defined by the gate lines and the data lines comprise: a pixel electrode and a common electrode disposed in the pixel region defined by the gate line and the data line and arranged in the same layer; the pixel electrode comprises a plurality of first stripe-shaped electrodes and the common electrode comprises a plurality of second stripe-shaped electrodes, and the first stripe-shaped electrodes and the second stripe-shaped electrodes are arranged at intervals.

For example, the stripe-shaped electrodes in the pixel region defined by the gate line and the data line comprise: an upper electrode and a lower electrode disposed in the pixel region defined by the gate line and the data line and arranged in different layers; the upper electrode comprises a plurality of stripe-shaped electrodes and the lower electrode is a planar electrode, or both the upper electrode and the lower electrode comprise a plurality of stripe-shaped electrodes.

Another aspect of the present invention provides a blue phase liquid crystal panel, comprising: a first substrate and a second substrate that are disposed opposite to each other so as to form a liquid crystal cell; a blue phase liquid crystal layer between the two substrates; a gate line, and a first data line and a second data line arranged to intersect the gate line to define a pixel region on an inner side of the first substrate, wherein the pixel region defined by the gate line and the first and second data lines is divided into a transmission region and a reflection region; a common electrode disposed in the pixel region; a pixel electrode disposed in the pixel region, the pixel electrode comprising a first pixel electrode in the transmission region and a second pixel electrode in the reflective region that is arranged in a same layer as the first pixel electrode. The blue phase liquid crystal panel has a single cell gap. At least one of the common electrode and the pixel electrode comprises a plurality of stripe-shaped electrodes. With power being supplied, the first data line and the second data line apply different voltages to the first pixel electrode and the second pixel electrode respectively, such that a voltage difference between the first pixel electrode and the common electrode is greater than that between the second pixel electrode and the common electrode in the same pixel region, and the light for display in the transmission region and the light for display in the reflection region generate the same phase retardation after passing through the blue phase liquid crystal layer.

For example, the blue phase liquid crystal panel further comprises: a first quarter wave plate, a first half wave plate, and a first polarizer disposed on an outer side of the first substrate; and a second quarter wave plate, a second half wave plate and a second polarizer disposed on an outer side of the second substrate.

For example, the first data line and the second data line are disposed respectively on two sides of the pixel region.

For example, in the reflection region, a reflective layer is disposed on the inner side of the first substrate, and an insulating layer is disposed on the reflective layer, the insulating layer extending in both the transmission region and the reflection region.

For example, a thickness of the insulating layer in the transmission region is greater than a thickness of the insulating layer in the reflection region, and difference between the thicknesses of the insulating layer in the two regions is equal to the thickness of the reflective layer.

For example, the common electrode and the pixel electrode are disposed in the same layer and both comprise stripe-shaped electrodes, and a distance between adjacent stripe-shaped electrodes in the transmission regions is equal to a distance between the adjacent stripe-shaped electrodes in the reflection regions in the same layer, the stripe-shaped electrodes of the first pixel electrode and the stripe-shaped electrodes of the common electrode in the transmission region being arranged at intervals, the stripe-shaped electrodes of the second pixel electrode and the stripe-shaped electrodes of the common electrode in the reflection region being arranged at intervals.

For example, the common electrode and the pixel electrode are disposed in different layers, and one of the common electrode and the pixel electrode that is in an upper layer comprises a plurality of stripe-shaped electrode, and the other thereof that is in a lower layer is a planar electrode; or, both of the common electrode and the pixel electrode comprise a plurality of stripe-shaped electrodes; a distance between adjacent stripe-shaped electrodes in the transmission regions is equal to a distance between the adjacent stripe-shaped electrodes in the reflection regions in the same layer.

A further aspect of the present invention provides a display device, comprising any one of the aforementioned blue phase liquid crystal panel.

The transflective mode blue phase liquid crystal panels provided in embodiments of the present invention have a single cell gap. By providing the adjacent stripe-shaped electrodes in the transmission regions with a distance smaller than that of the adjacent stripe-shaped electrodes in the reflection regions in the same layer, or applying a voltage difference between the first pixel electrode and the common electrode greater than that between the second pixel electrode and the common electrode in the same pixel region with power being supplied, the light for display in the transmission region and the light for display in the reflection region generate the same phase retardation after passing through the blue phase liquid crystal layer, thereby realizing the display effect of the transflective mode blue phase liquid crystal panel with a single cell gap. Since the embodiments of the present invention adopt the structure of a single cell gap, the manufacturing process can be simplified.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

With reference to FIGS. 1-3, and 7-9, the embodiments of the present invention each provide a blue phase liquid crystal panel, the liquid crystal panel comprising: a first substrate 11 and a second substrate 12 that are disposed opposite to each other so as to form a liquid crystal cell, and a blue phase liquid crystal layer 13 provided between the two substrates 11, 12. The liquid crystal panel further comprises: gate lines 300 on an inner side of the first substrate 11, and data lines 301 arranged to intersect the gate lines, and stripe-shaped electrodes located in pixel regions defined by the gate lines and the data lines. These gate lines and data lines intersect each other (e.g., perpendicularly intersect) so as to define a plurality of pixel regions, which pixel regions are arranged in an array. Each of the pixel regions may comprise a thin film transistor as a switch element and a pixel electrode for driving the liquid crystal to rotate. The following description is only in connection with one pixel region.

The blue phase liquid crystal panel has a single cell gap, and each pixel region is divided into a transmission region and a reflection region, i.e., the transmission region and the reflection region have the same cell gap. A distance between the adjacent stripe-shaped electrodes in the transmission region is smaller than a distance between the adjacent stripe-shaped electrodes in the reflection region in the same layer, such that the light for display in the transmission region and that in the reflection region of a same pixel region generate the same phase retardation after passing through the blue phase liquid crystal layer. It should be noted that all illustrations shall not be construed as limiting the shape or size of the reflection region and the transmission region but serving as reference only.

Figure 1:
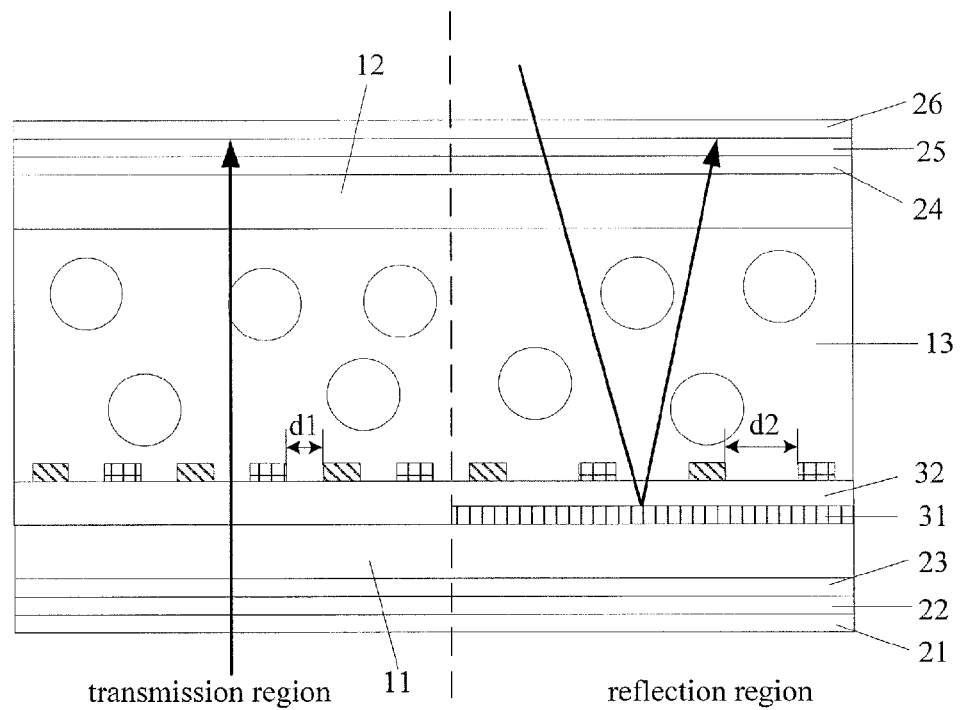
FIG. 1 is a structural schematic view of a transflective mode blue phase liquid crystal panel provided in the present invention when no voltage is applied.
Figure 2:
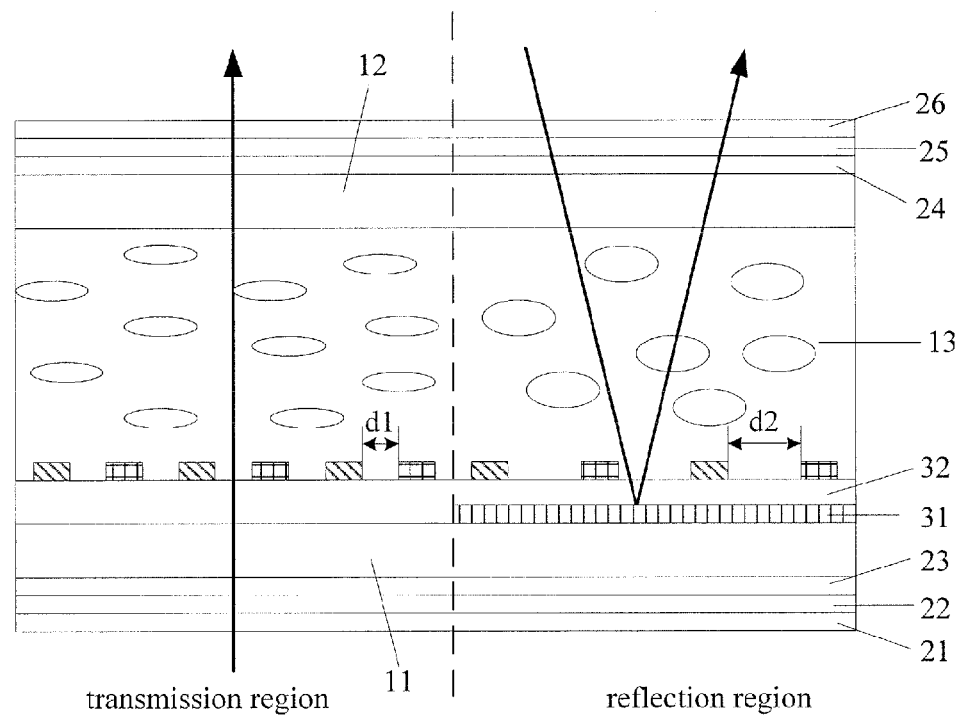
FIG. 2 is a structural schematic view of the transflective mode blue phase liquid crystal panel illustrated in FIG. 1 while voltages are applied.
Figure 3:
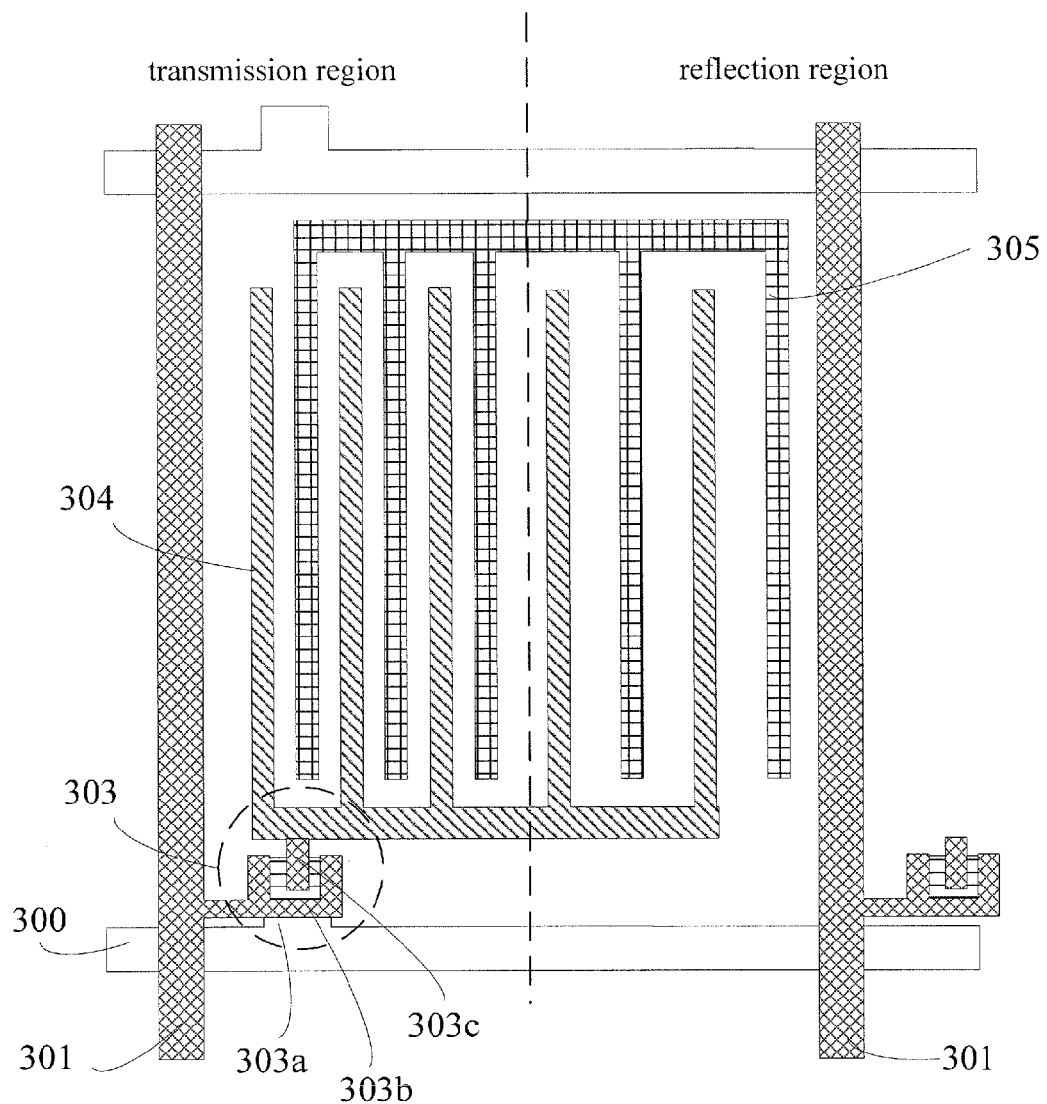
FIG. 3 is a structural schematic view of the pixel structure in the transflective mode blue phase liquid crystal panel illustrated in FIG. 1.
Figure 7:
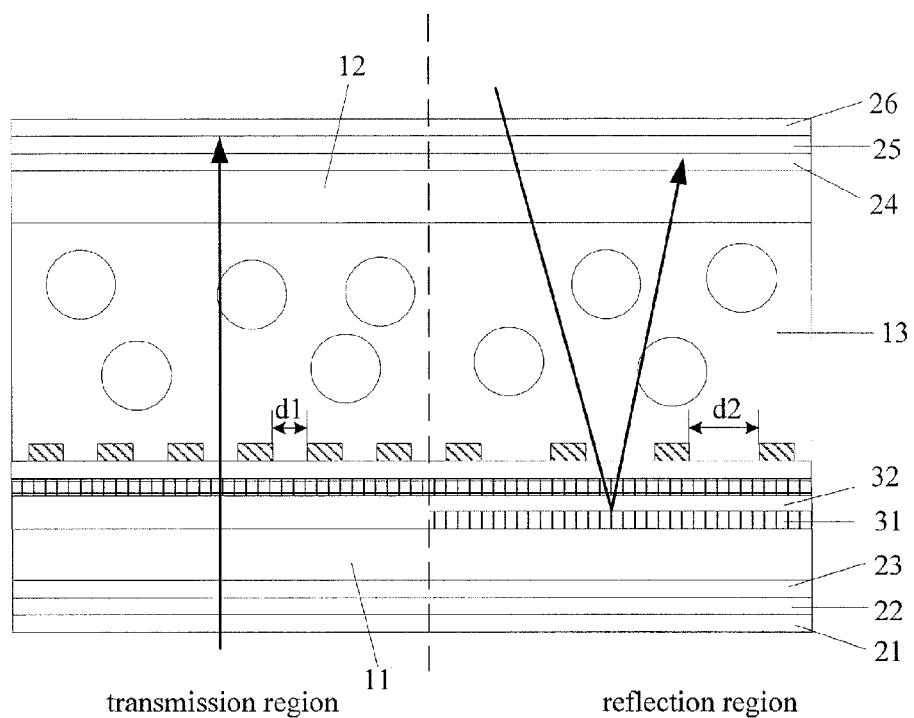
FIG. 7 is a structural schematic view of another transflective mode blue phase liquid crystal panel provided in the present invention when no voltage is applied.
Figure 8:
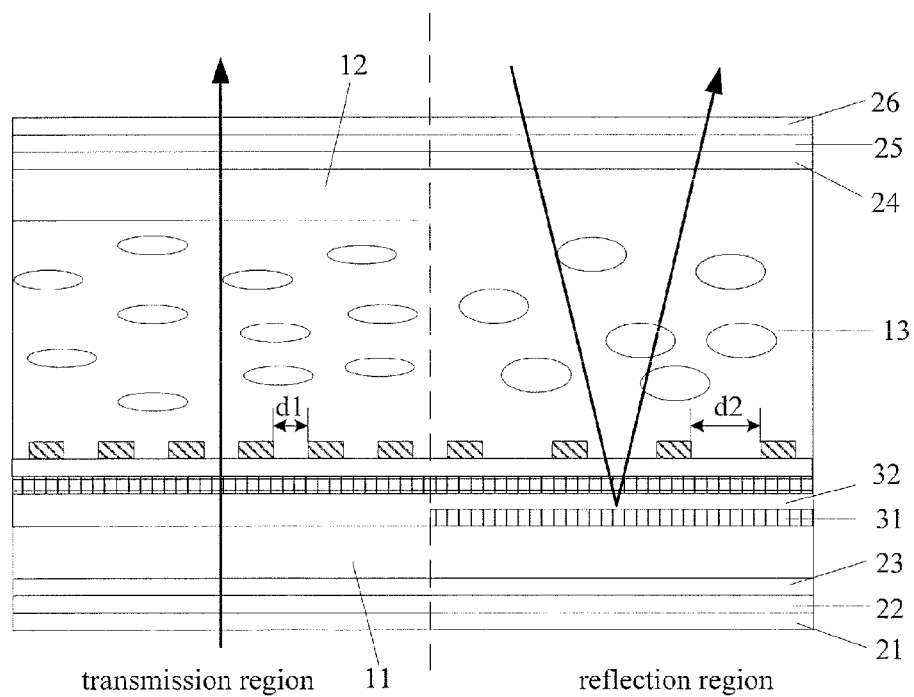
FIG. 8 is a structural schematic view of the transflective mode blue phase liquid crystal panel illustrated in FIG. 7 while voltages are applied.
Figure 9:
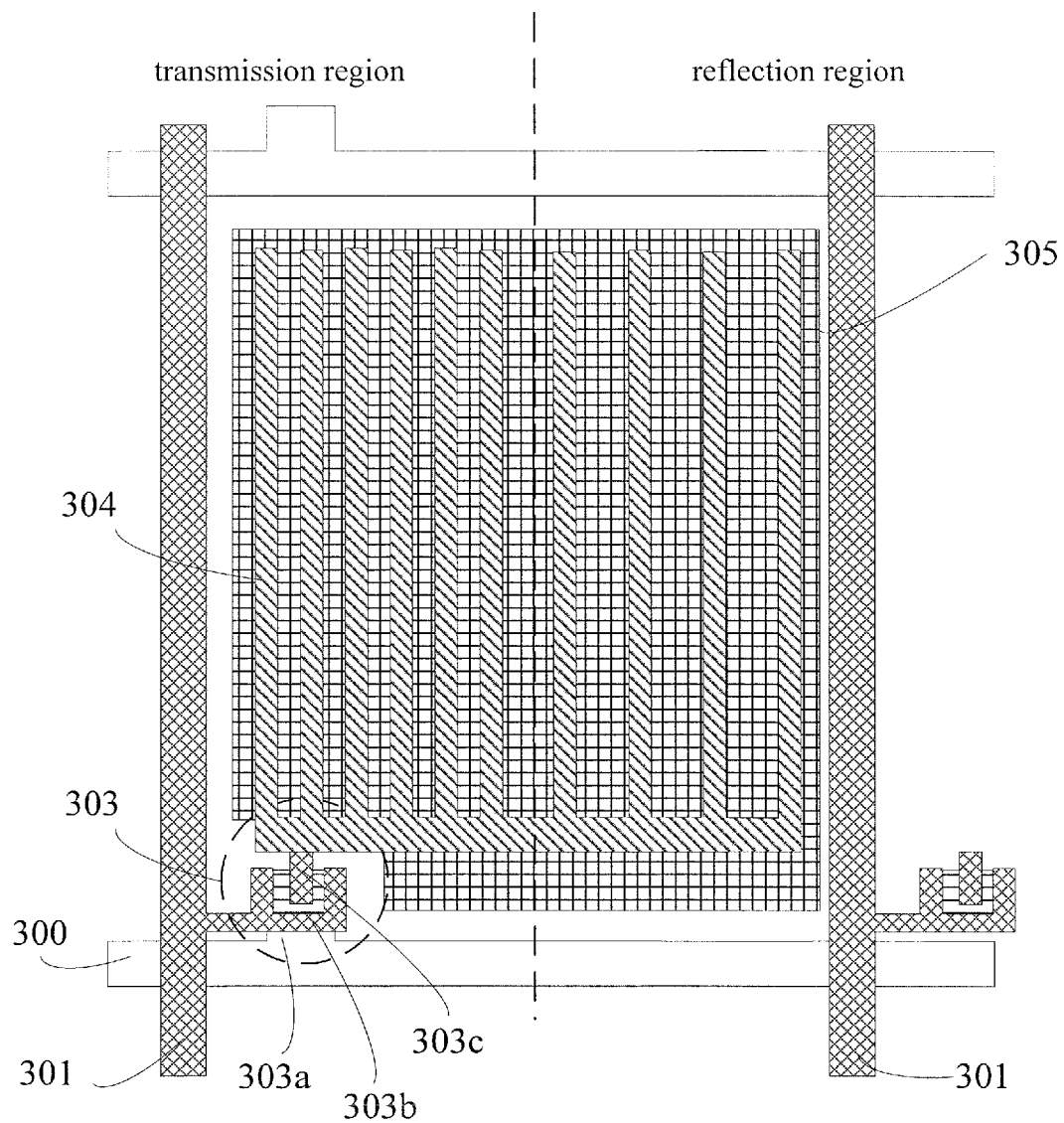
FIG. 9 is a structural schematic view of the pixel structure in the transflective mode blue phase liquid crystal panel illustrated in FIG. 7.

FIGS. 1-3 relate to an example of a liquid crystal panel of an In-plane Switch (IPS) type liquid crystal display. FIGS. 7-9 relate to an example of a liquid crystal panel of an Advanced-super Dimensional Switching (ADS) type liquid crystal display.

With reference to FIGS. 1-3, the stripe-shaped electrodes in the pixel region defined by the gate lines and the data lines comprise: a pixel electrode 304 and a common electrode 305 disposed in the pixel region defined by the gate lines and the data lines and arranged in the same layer. The pixel electrode 304 comprises a plurality of first stripe-shaped electrodes and the common electrode 305 comprises a plurality of second stripe-shaped electrodes, the first stripe-shaped electrodes and the second stripe-shaped electrodes being arranged at a predetermined interval. In this case, a distance between the adjacent stripe-shaped electrodes in the transmission region is smaller than a distance between the adjacent stripe-shaped electrodes in the reflection region.

In this disclosure, the phrase "arranged in a same layer" generally refers to at least two patterns. At least two patterns arranged in the same layer means that a same thin film is formed into the at least two patterns by a patterning process. For example, the aforesaid pixel electrode and common electrode arranged in the same layer refer to the case in which the pixel electrode and the common electrode are formed by a same transparent conductive thin film by a patterning process. The pixel electrode refers to an electrode connected to a data line via a switching unit (e.g., thin film transistor) and applied with a data signal voltage; the common electrode refers to an electrode connected to a common electrode line and applied with a common voltage.

Herein with reference to FIG. 3, the pixel structure disposed in the pixel region on the inner side of the first substrate 11 is described with more details. As illustrated in the figure, the pixel region is further provided with a thin film transistor. For example, a gate electrode 303a, a source electrode 303b and a drain electrode 303c of the thin film transistor are electrically connected to a gate line 303, a data line 301, and a pixel electrode 304, respectively. The common electrode 305 is connected to a common electrode line (not illustrated). With the power supplied, the data line 301 can apply a voltage to the pixel electrode 304 through the thin film transistor 303, and the common electrode line can apply a voltage to the common electrode 305, so as to generate a horizontal electric field between the pixel electrode 304 and the common electrode 305 for driving the blue phase liquid crystal panel.

Optionally, with reference to FIGS. 7-9, the stripe-shaped electrodes in the pixel region defined by a gate line and a data line comprise: an upper electrode and a lower electrode disposed in the pixel region defined by the gate line 300 and the data line 301 and arranged in different layers; the upper electrode comprises a plurality of stripe-shaped electrodes and the lower electrode is a planar electrode. In this case, a distance between the adjacent stripe-shaped electrodes of the upper electrode in the transmission region is smaller than a distance between the adjacent stripe-shaped electrodes of the upper electrode in the reflection region.

Or, the stripe-shaped electrodes in the pixel region defined by a gate line and a data line comprise: an upper electrode and a lower electrode disposed in the pixel region defined by the gate line and the data line and arranged in different layers; both the upper electrode and the lower electrode comprise a plurality of stripe-shaped electrodes. Although it is not illustrated in the drawings, the structure of the liquid crystal panel can be obtained directly and unambiguously by those skilled in the art with reference to FIGS. 7-9. In this case, a distance between the adjacent stripe-shaped electrodes of the upper electrode in the transmission region is smaller than a distance between the adjacent stripe-shaped electrodes of the upper electrode in the reflection region, and a distance between the adjacent stripe-shaped electrodes of the lower electrode in the transmission region is also smaller than a distance between the adjacent stripe-shaped electrodes of the lower electrode in the reflection region.

In this disclosure, the phrase "arranged in different layers" also refers to at least two patterns. Two patterns arranged in different layers means that at least two layers of thin films are formed into the at least two patterns by patterning processes. For example, two patterns arranged in different layers means that each of two layers of thin films is formed into a pattern by a patterning process. For example, the aforesaid upper electrode and lower electrode arranged in different layers refer to a lower electrode formed by the first transparent conductive thin film by a patterning process, and an upper electrode formed by the second transparent conductive thin film by a patterning process.

In this disclosure, the upper layer and the lower layer are defined according to the order in the manufacturing process; the lower layer refers to the layer manufactured earlier while the upper layer refers to the layer manufactured later. What needs to be explained is that which one of the upper electrode and the lower electrode serves as the common electrode or the pixel electrode is related to the connection thereof. If the upper (lower) electrode is connected to a data line through the switching element, the upper (lower) electrode serves as the pixel electrode; if the upper (lower) electrode is connected to a common electrode line, the upper (lower) electrode serves as the common electrode. FIGS. 7-9 show the example of the upper electrode serving as the pixel electrode 304 and the lower electrode serving as the common electrode 305.

Herein with reference to FIG. 9, the pixel structure disposed in the pixel region on the inner side of the first substrate is described with more details. The pixel region is further provided with a thin film transistor. For example, a gate electrode 303a, a source electrode 303b and a drain electrode 303c of the thin film transistor are electrically connected to a gate line 303, a data line 301 and a pixel electrode 304, respectively. The common electrode 305 is connected to a common electrode line (not illustrated). With the power supplied, the data line 301 can apply a voltage to the pixel electrode 304 through the thin film transistor 303, and the common electrode line can apply a voltage to the common electrode 305, so as to generate a horizontal electric field between the pixel electrode 304 and the common electrode 305 for driving the blue phase liquid crystal panel.

In this disclosure, the transmission region refers to a region in which the light from backlight source is emitted through the first substrate, the blue phase liquid crystal layer and the second substrate sequentially; the reflection region refers to a region in which a reflective layer 31 is provided, in which the environmental light from the outside of the display panel arrives the reflective layer through the second substrate and the blue phase liquid crystal layer, is reflected by the reflective layer, and then exists through the blue phase liquid crystal layer and the second substrate.

In the reflection region, a reflective layer 31 is provided on the inner side of the first substrate; and an insulating layer 32 is provided on the reflective layer 31, the insulating layer 32 extending within both the transmission region and the reflection region. Preferably, a thickness of the insulating layer 32 in the transmission region is greater than a thickness of the insulating layer 32 in the reflection region, and difference between the thicknesses of the insulating layer in the two regions is equal to the thickness of the reflective layer. Thus, it can be ensured that the blue phase liquid crystal panel provided with the insulating layer still has a single cell gap, i.e., the blue phase liquid crystal layer in the transmission region has the same thickness as that in the reflection region.

The aforementioned blue phase liquid crystal layer contains blue phase liquid crystal molecules, which have the characteristics that the blue phase liquid crystal molecules have isotropic property when no voltage is applied; and that the blue phase liquid crystal molecules have bi-refractive property along a direction when a voltage is applied, and the blue phase liquid crystal molecules are aligned along the direction of the electric field. Due to the above characteristics of the blue phase liquid crystal layer, the blue phase liquid crystal panel can be driven by the horizontal electric field generated by the pixel electrode and the common electrode in the embodiments of the present invention. The blue phase liquid crystal is for example polymer-stabilized-blue phase liquid crystal or the like.

In this disclosure, a patterning process is for example a photolithography patterning process, for example comprising: coating a structural layer to be patterned with a photoresist layer, exposing the photoresist layer using a mask plate, developing the exposed photoresist layer to obtain a photoresist pattern, etching the structural layer using the photoresist pattern, and then selectively removing the photoresist pattern. The patterning process may also be a screen printing, an ink jet printing method, or the like.

A distance between the aforementioned adjacent stripe-shaped electrodes in the transmission regions is smaller than a distance between the adjacent stripe-shaped electrodes in the reflection regions, the ratio between them is dependent on the properties (such as birefringence, dielectric anisotropy, Kerr constant, and the like) of the adopted blue phase liquid crystal. For example, the following method may be adopted for testing the panel containing a particular blue phase liquid crystal so as to determine the ratio of the two distances. Firstly, different test panels are prepared according to several preset distance ratios, the test panels being filled with the particular blue phase liquid crystal. Secondly, V-T (voltage-transmittance) characteristics curve of the transmission region and the reflection region of the test panels are drawn. If the characteristics curve of the transmission region and the reflection region of a same test panel are consistent within a range of error, it means thin the transmission region has a phase retardation substantially twice bigger than that of the reflection region, and thus the ratio of the test panel may serve as a reference value in the practical production. In the embodiments of the present invention, the ratio is not limited, as long as the light for display generates the same phase retardation after passing through the blue phase liquid crystal layer in the transmission region and the reflection region of one pixel region in the practical production.

In one example, the aforementioned blue phase liquid crystal panel may further comprise: a first quarter wave plate 23, a first half wave plate 22, and a first polarizer 21 disposed on an outer side of the first substrate 11; a second quarter wave plate 24, a second half wave plate 25 and a second polarizer 26 disposed on an outer side of the second substrate 12.

In the example, for example, the first quarter wave plate 23, the first half wave plate 22, and the first polarizer 21 are disposed on the outer side of the first substrate 11 sequentially from inside to outside; the second quarter wave plate 24, the second half wave plate 25 and the second polarizer 26 are disposed on the outer side of the second substrate 12 sequentially from inside to outside.

Herein, details are provided regarding how the aforementioned blue phase liquid panel of an IPS display realizes transflective display.

FIG. 1 is a structural schematic view of the blue phase liquid crystal panel when no voltage is applied. Since the blue phase liquid crystal molecules in the blue phase liquid crystal layer are isotropic when no voltage is applied, the light for display will not generate phase retardation after passing the isotropic blue phase liquid crystal layer 13 in the transmission region and the reflection region. If the polarization direction of the first polarizer 21 is at an angle of 90 degrees to that of the second polarizer 26, the emitting light will be completely blocked by the second polarizer 26 so as to realize the display in a dark state.

FIG. 2 is a structural schematic view of the blue phase liquid crystal panel while voltages are applied. Under the action of the horizontal electric field, the blue phase liquid crystal molecules generate phase retardation in the horizontal direction, the distance d1 between the adjacent stripe-shaped electrodes in the transmission region is different from the distance d2 between the adjacent stripe-shaped electrodes in the reflection region, and d1<d2. Since the distance d1 between the adjacent stripe-shaped electrodes in the transmission region is smaller, greater electric field strength will be generated, and the blue phase liquid crystal molecules will generate greater phase retardation Δn1 under the stronger electric field effect. On the contrary, since the distance d2 between the adjacent stripe-shaped electrodes in the reflection region is bigger, less electric field strength will be generated, the blue phase liquid crystal molecules will generate smaller phase retardation Δn2 under the weaker electric field effect. Due to the reflection effect of the reflective layer 31, the light of the reflection region will pass through the blue phase liquid crystal layer twice. So the propagation distance D2 of the light in the reflection region passing through the blue phase liquid crystal layer is about twice greater than the propagation distance D1 of the light in the transmission region passing through the blue phase liquid crystal layer, i.e., approximately D2=2*D1. Therefore, by optimizing the distances d1 and d2 between the adjacent stripe-shaped electrodes in the transmission region and the reflection region, light for display in the transmission region and the reflection region of one pixel region generate the same phase retardation after passing through the blue phase liquid crystal layer, i.e., Δn1*D1=Δn2*D2, thus achieving the transflective display effect.

Regarding how the blue phase liquid panel of ADS display realizes transflective display, the aforementioned principle may be referenced and no more details are provided herein.

The transflective mode blue phase liquid crystal display provided in the embodiments of the present invention has a single cell gap. By providing the adjacent stripe-shaped electrodes in the transmission regions with a distance smaller than that of the adjacent stripe-shaped electrodes in the reflection regions in the pixel region, the light for display generate the same phase retardation after passing through the blue phase liquid crystal layer in the transmission region and the reflection region, thereby realizing the transflective mode blue phase liquid crystal panel with a single cell gap. Since the embodiments of the present invention adopt the structure of a single cell gap, the manufacturing process can be simplified.

Referring to FIGS. 4-6, and 10-12, the embodiments of the present invention further provide a blue phase liquid crystal display panel, the liquid crystal panel comprising: a first substrate 11 and a second substrate 12 that are disposed opposite to each other so as to form a liquid crystal cell, and a blue phase liquid crystal layer 13 between the two substrates. The blue phase liquid crystal panel further comprises: gate lines 600, and first data lines 601 and second data lines 602 arranged to intersect the gate lines to define pixel regions, on an inner side of the first substrate 11. These gate lines and the first and second data lines define a plurality of pixel regions arranged in array. Each of the pixel regions may be divided into a transmission region and a reflection region. The following description is only connected with one pixel region.

The blue phase liquid crystal panel of the present embodiment also has a single cell gap. The blue phase liquid crystal panel further comprises: a common electrode 607 in the entire pixel region (i.e., including the reflection region and the transmission region), a first pixel electrode 605 in the transmission region and a second pixel electrode 606 in the reflection region and arranged in the same layer as the first pixel electrode. At least one of the common electrode 607 and the pixel electrode (including the first pixel electrode 605 and the second pixel electrode 606) comprises a plurality of stripe-shaped electrodes. With power being supplied, a first data line 601 and a second data line 602 apply different voltages to the first pixel electrode 605 and the second pixel electrode 606 respectively, such that a voltage difference between the first pixel electrode 605 and the common electrode 607 is greater than that between the second pixel electrode 606 and the common electrode 607 in a same pixel region, and the light for display generate the same phase retardation after passing through the blue phase liquid crystal layer in the transmission region and the reflection region. For example, preferably, a distance between adjacent stripe-shaped electrodes in the transmission regions is equal to a distance between the adjacent stripe-shaped electrodes in the reflection regions in the same layer.

Figure 4:
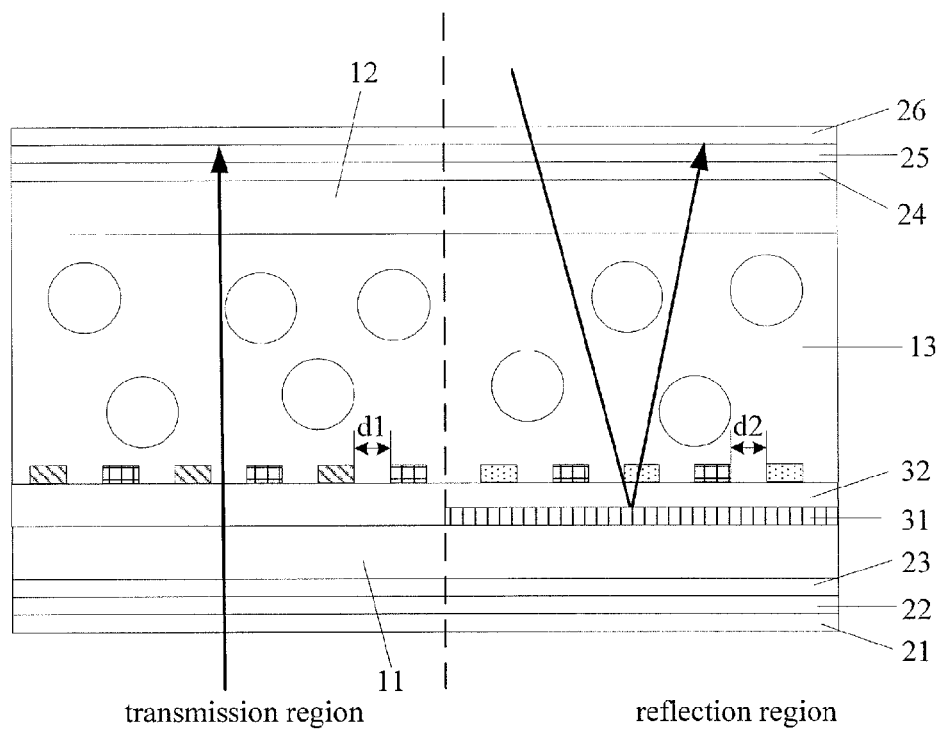
FIG. 4 is a structural schematic view of another transflective mode blue phase liquid crystal panel provided in the present invention when no voltage is applied.
Figure 5:
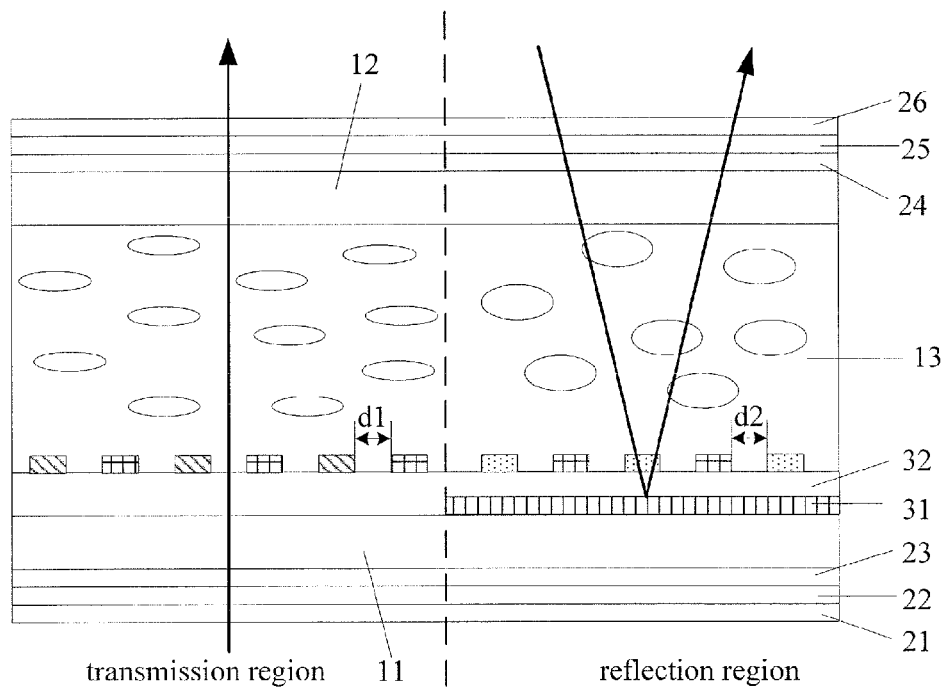
FIG. 5 is a structural schematic view of the transflective mode blue phase liquid crystal panel illustrated in FIG. 4 while voltages are applied.
Figure 6:
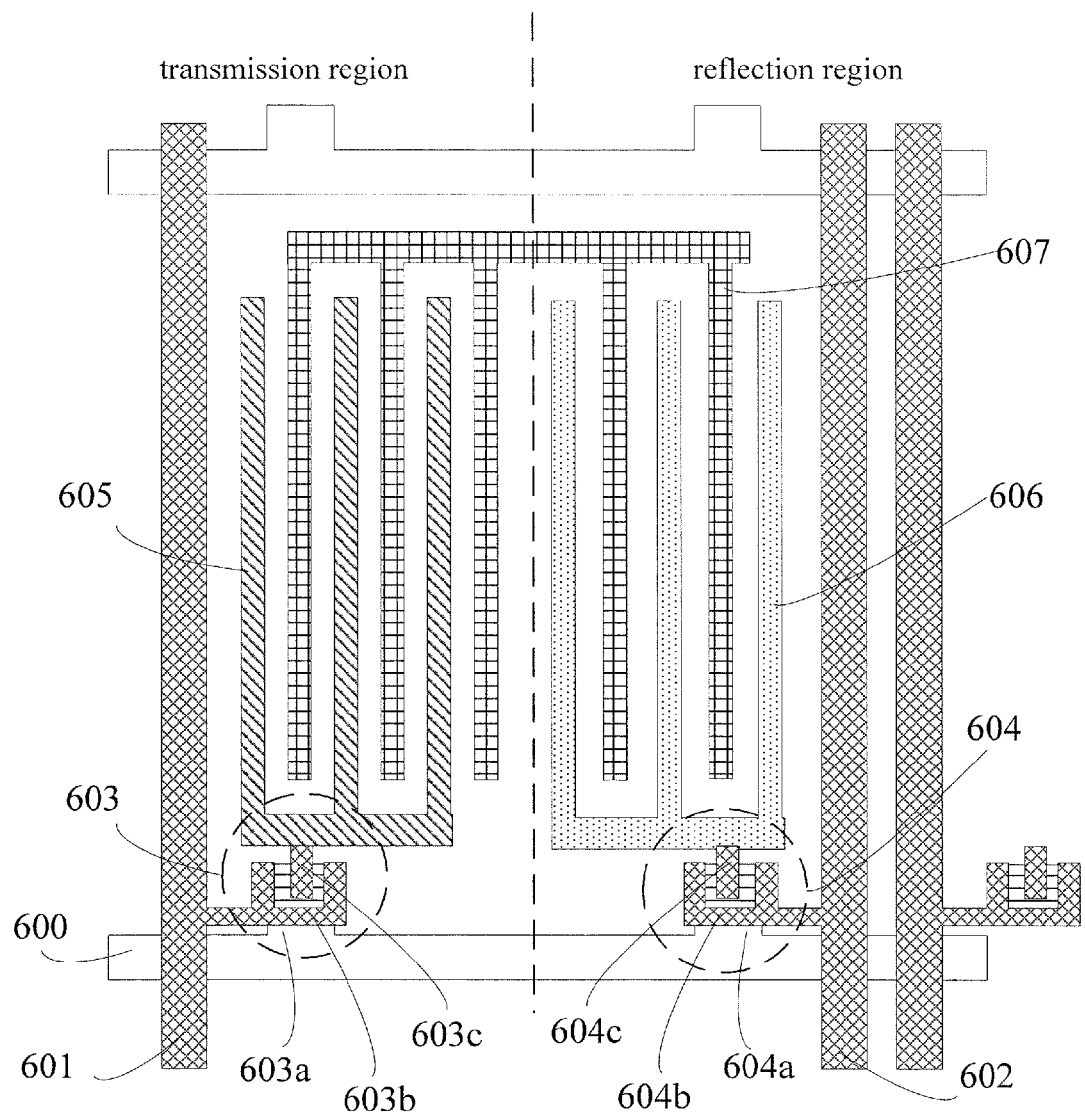
FIG. 6 is a structural schematic view of the pixel structure in the transflective mode blue phase liquid crystal panel illustrated in FIG. 4.
Figure 10:
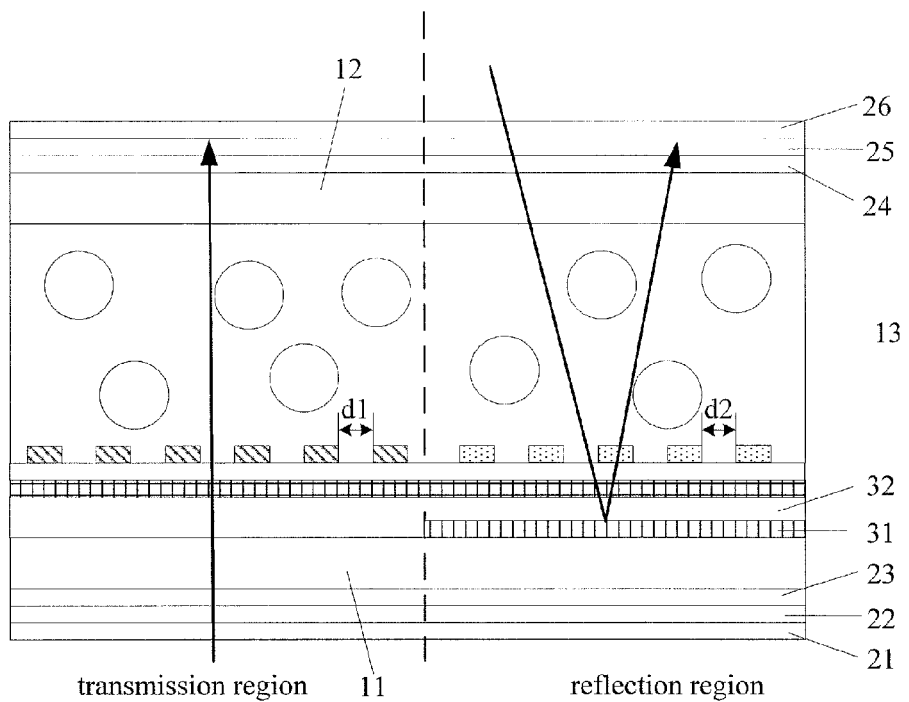
FIG. 10 is a structural schematic view of a transflective mode blue phase liquid crystal panel provided in the present invention when no voltage is applied.
Figure 11:
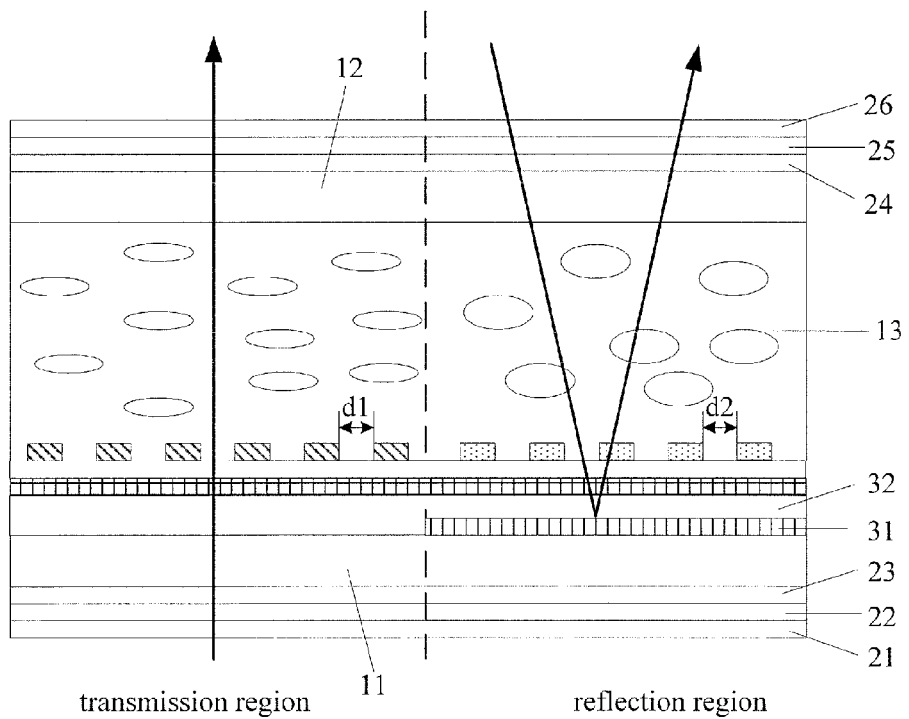
FIG. 11 is a structural schematic view of the transflective mode blue phase liquid crystal panel illustrated in FIG. 10 while voltages are applied.
Figure 12:
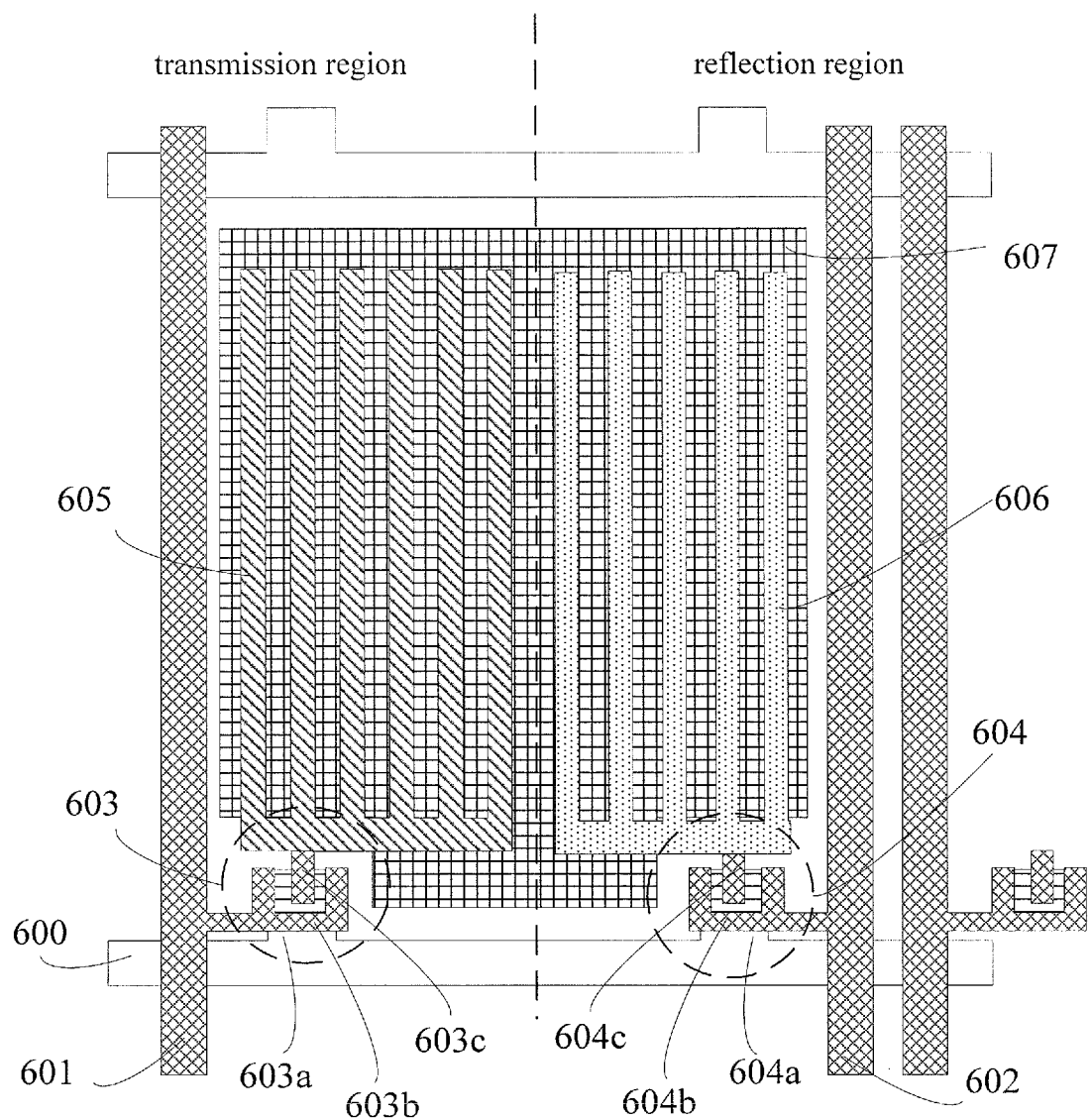
FIG. 12 is a structural schematic view of the pixel structure in the transflective mode blue phase liquid crystal panel illustrated in FIG. 10.

FIGS. 4-6 relate to a liquid crystal panel of an IPS type liquid crystal display; FIGS. 10-12 relate to a liquid crystal panel of an ADS type liquid crystal display.

As illustrated in FIGS. 4-6, for example, the common electrode comprises a plurality of stripe-shaped electrodes, and the pixel electrode comprises a plurality of stripe-shaped electrodes. The common electrode 607 and the pixel electrode (including the first pixel electrode 605 and the second pixel electrode 606) are arranged in the same layer; the stripe-shaped electrodes of the first pixel electrode 605 and the stripe-shaped electrodes of the common electrode 607 in the transmission region are arranged at intervals, the stripe-shaped electrodes of the second pixel electrode 606 and the stripe-shaped electrodes of the common electrode 607 in the reflection region are arranged at intervals.

Herein with reference to FIG. 6, the pixel structure provided on the inner side of the first substrate in the aforementioned liquid crystal panel is described in more details. The blue phase liquid crystal panel further comprises a first thin film transistor 603 and a second thin film transistor 604 in the pixel region. A first data line 601 and a second data lines 602 apply different voltages to the first pixel electrode 605 and the second pixel electrode 606 respectively for example in the following manner. The first data line 601 applies a first voltage to the first pixel electrode 605 through the first thin film transistor 603; the second data line 602 applies a second voltage to the second pixel electrode 606 through the second thin film transistor 604, and the first voltage and the second voltage are not equal to each other.

Specifically, a gate electrode 603a, a source electrode 603b and a drain electrode 603c of the first thin film transistor are electrically connected to the gate line 600, the first data line 601 and the first pixel electrode 605 respectively; a gate electrode 604a, a source electrode 604b and a drain electrode 604c of the second thin film transistor are electrically connected to the gate line 600, the second data lines 602 and the second pixel electrode 606 respectively. In this case, when power being supplied, the first data lines 601 can apply a first voltage to the first pixel electrode 605, and the second data lines 602 can apply a second voltage to the second pixel electrode 606. Preferably, the first data lines 601 and the second data lines 602 are disposed respectively on two sides of the pixel regions.

Optionally, referring to FIGS. 10-12, at least one of the common electrode and the pixel electrode comprises a plurality of stripe-shaped electrodes. The common electrode and the pixel electrode are arranged in different layers. That is to say, the first pixel electrode 605 and the second pixel electrode 606 are arranged in the same layer, which is different from the layer where the common electrode is arranged. The electrode in the upper layer out of the common electrode and the pixel electrode comprises a plurality of stripe-shaped electrodes, and the electrode in the lower layer is a planar electrode. The figure shows the example in which the pixel electrode is in the upper layer while the common electrode is in the lower layer. Of course, the common electrode may be in the upper layer while the pixel electrode is in the lower layer.

The connecting relationship between the thin film transistor and the gate line, the first and the second data lines in the pixel structure illustrated in FIG. 12 is same as that illustrated in FIG. 6, so no more details are give here. The difference lies in that a distance between the adjacent stripe-shaped electrodes of the first pixel electrode in the transmission regions is equal to a distance between the adjacent stripe-shaped electrodes of the second pixel electrode in the reflection regions in FIG. 12. Similarly, preferably, the first data lines 601 and the second data lines 602 are disposed respectively on two sides of the pixel regions.

Or, the common electrode and the pixel electrode are arranged in different layers, and both the common electrode and the pixel electrode comprise a plurality of stripe-shaped electrodes. Although not illustrated in the figures, the structure of such liquid crystal panel can be determined unambiguously by those skilled in the art with reference to FIGS. 10-12. In such liquid crystal panel, a distance between the adjacent stripe-shaped electrodes of the first pixel electrode is equal to a distance between the adjacent stripe-shaped electrodes of the second pixel electrode, and a distance between the adjacent stripe-shaped electrodes of the common electrode in the transmission regions is equal to a distance between the adjacent stripe-shaped electrodes in the reflection regions.

In the reflection region of the liquid crystal display panel, a reflective layer 31 is further provided in the inner side of the first substrate; and an insulating layer 32 is provided on the reflective layer 31, and the insulating layer 32 extends into both the transmission region and the reflection region. Preferably, a thickness of the insulating layer 32 in the transmission region is greater than a thickness of the insulating layer 32 in the reflection region, and difference between the thicknesses of the insulating layer in the two regions is equal to the thickness of the reflective layer. Thus, it can be ensured that the blue phase liquid crystal panel provided with the insulating layer still has a single cell gap, i.e., the blue phase liquid crystal layer in the transmission region has the same thickness as that in the reflection region.

It should be noted is that all figures serve as reference only, and are not drawn in the practical scale. So the figures shall not be construed as limiting the shape or size of the reflection region and the transmission region. The first pixel electrode and the second pixel electrode may be set to have the same size or different sizes.

Electrodes arranged in the same layer means that the first pixel electrode, the second pixel electrode and the common electrode are formed of a same transparent conductive thin film by a patterning process. The first pixel electrode and the second pixel electrode are not electrically connected to each other and are applied with different voltages via the first data line and the second data line. The common electrode refers to the electrode connected to the common electrode line.

With power being supplied, the first data line and the second data line respectively apply different voltages to the first pixel electrode and the second pixel electrode, the values of voltage are dependent on the natures (e.g., birefringence, dielectric anisotropy, Kerr constant, etc.) of the blue phase liquid crystal. For example, the following method may be adopted for testing the panel containing a particular blue phase liquid crystal so as to determine the ratio of the two kinds of voltage values. Firstly, a test panel is prepared according to the preset distance ratio, the test panel being filled with the particular blue phase liquid crystal. Secondly, by applying voltages to the first pixel electrode in the transmission region via the first data line and applying voltages to the second pixel electrode in the reflection region via the second data line, the V-T (voltage-transmittance) characteristics curves of the transmission region and the reflection region of the test panel are drawn. The characteristics curves of the two regions are analyzed, and values of voltages over the first and the second data lines in each position with consistent transmittance are sequentially obtained. In the embodiment of the present invention, the values of voltage applied to the two pixel electrodes are not limited, as long as the light for display in the transmission region and the light for display in the reflection region of one pixel region generate the same phase retardation after passing through the blue phase liquid crystal layer. However, a voltage difference between the first pixel electrode and the common electrode must be greater than that between the second pixel electrode and the common electrode in the same pixel region, thus providing preconditions for the same phase retardation of the transmission region and the reflection region.

Furthermore, in one example, the blue phase liquid crystal panel may comprise: a first quarter wave plate 23, a first half wave plate 22, and a first polarizer 21 disposed on an outer side of the first substrate 11; a second quarter wave plate 24, a second half wave plate 25 and a second polarizer 26 disposed on an outer side of the second substrate 12.

In this example, for example, the first quarter wave plate 23, the first half wave plate 22, and the first polarizer 21 are disposed on the outer side of the first substrate 11 sequentially from inside to outside; the second quarter wave plate 24, the second half wave plate 25 and the second polarizer 26 are disposed on the outer side of the second substrate 12 sequentially from inside to outside.

Herein, details are provided to describe how the aforementioned blue phase liquid panel of an IPS type display to realize transflective display.

FIG. 4 is a structural schematic view of the blue phase liquid crystal panel when no voltage is applied. Since the blue phase liquid crystal molecules in the blue phase liquid crystal layer are isotropic when no voltage is applied, the light for display in both the transmission region and the reflection region will not generate phase retardation after passing the isotropic blue phase liquid crystal layer. If the polarization direction of the first polarizer 21 is at an angle of 90 degrees to that of the second polarizer 26, the emitting light will be completely blocked by the second polarizer 26 so as to realize the display in a dark state.

FIG. 5 is a structural schematic view of the blue phase liquid crystal panel when voltages are applied. Under the action of the horizontal electric field, the blue phase liquid crystal molecules generate phase retardation in the horizontal direction. By applying different voltages to the first pixel electrode and the second pixel electrode, the voltage difference between the first pixel electrode and the common electrode is greater than that between the second pixel electrode and the common electrode in the same pixel region. Since a greater voltage difference generates a stronger electric field, the transmission region will generate greater electric field strength, and the blue phase liquid crystal molecules will generate greater phase retardation $\Delta n1$ under the stronger electric field effect; and the reflection region will generate less electric field strength, and the blue phase liquid crystal molecules will generate smaller phase retardation $\Delta n2$ under the weaker electric field effect. Since the light of the reflection region will pass through the blue phase liquid crystal layer twice, the propagation distance D2 of the light of the reflection region passing through the blue phase liquid crystal layer is about twice greater than the propagation distance D1 of the light of the transmission region passing through the blue phase liquid crystal layer, i.e., about $D2=2*D1$. Therefore, by applying different voltages to the first pixel electrode and the second pixel electrode, the light for display in the transmission region and the light for display in the reflection region of one pixel region generate the same phase retardation after passing through the blue phase liquid crystal layer, i.e., $\Delta n1*D1=\Delta n2*D2$, thus achieving the transflective display effect. If a distance d1 between the adjacent stripe-shaped electrodes in the transmission region is equal to a distance d2 between the adjacent stripe-shaped electrodes in the reflection region, i.e., $d1=d2$, the effect of the distance between the adjacent stripe-shaped electrodes in the transmission region and the reflection region on the horizontal electric field will not be taken into consideration, but the effect of the different voltages, respectively applied to the first pixel electrode in the transmission region and to the second pixel electrode in the reflection region, on the electric field is employed.

About how the blue phase liquid panel of ADS display to realize transflective display, the aforementioned principle can be referenced and no more details are provided here.

The transflective mode blue phase liquid crystal display provided in the embodiment of the present invention has a single cell gap. With power being supplied, the voltage difference between the first pixel electrode and the common electrode is greater than that between the second pixel electrode and the common electrode in the same pixel region, so that the light for display in the transmission region and the light for display in the reflection region generate the same phase retardation after passing through the blue phase liquid crystal layer, thereby realizing the display function of the transflective mode blue phase liquid crystal panel with a single cell gap. Since the embodiment of the present invention adopts the structure of a single cell gap, the manufacturing process can be simplified. For example, preferably, the distance between the adjacent stripe-shaped electrodes in the transmission region may be equal to the distance between the adjacent stripe-shaped electrodes in the reflection region.

What needs to be explained is that, in order to clearly describe the claimed structure in the present invention, irrelevant structures are simplified or omitted in the embodiments and the accompanying drawings, which are easily obtained by those skilled in the art without any creative work.

In addition, the aforementioned two blue phase liquid crystal panels provided in the embodiments of the present invention belong to a single general inventive concept, i.e., with power being supplied, the transmission region generates greater electric field strength while the reflection region generates less electric field strength in a same pixel region, so the blue phase liquid crystal molecules in the transmission region generates greater phase retardation while those in the reflection region generates smaller phase retardation, so that the light for display in the transmission region and the light for display the reflection region in the same pixel region generate the same phase retardation after passing through the blue phase liquid crystal layer. There are two main factors affecting the electric field strength: one is the distance between adjacent stripe-shaped electrodes, the other is the voltage difference between the pixel electrode and the common electrode. In the blue phase liquid crystal panel illustrated in FIGS. 1, 2, 7 and 8, there is only one pixel electrode in each pixel region, so the voltage differences between the two electrodes in the transmission region and the reflection region are same to each other. In this case, by setting different distances between adjacent stripe-shaped electrodes in the transmission region and the reflection region in the same layer, different electric field strengths may be generated. In the blue phase liquid crystal panel illustrated in FIGS. 4, 5, 10 and 12, for example, in the case that the adjacent stripe-shaped electrodes have the same distance in the transmission region and the reflection region in the same layer, by applying different voltages to the first pixel electrode and the second pixel electrode, the voltage differences between the two electrodes (pixel electrode and common electrode) in the transmission region and the reflection region are different from each other, whereby different electric field strengths can be generated.

The present embodiment further provides a display device, which comprises any one of the aforementioned blue phase liquid crystal panel. The display device may be a liquid crystal display, a liquid crystal television, a digital photo frame, a mobile phone, a flat panel computer, and other products or components having display function.

The above embodiment of the present invention are given by way of illustration only and thus are not limitative of the protection scope of the present invention, which is determined by the attached claims.

The invention claimed is:

1. A blue phase liquid crystal panel, comprising:
   a first substrate and a second substrate that are disposed opposite to each other so as to form a liquid crystal cell;
   a blue phase liquid crystal layer between the two substrates;
   a gate line, and a first data line and a second data line arranged to intersect the gate line to define a pixel region on an inner side of the first substrate, wherein the pixel region defined by the gate line and the first and second data lines is divided into a transmission region and a reflection region;
   a common electrode disposed in the pixel region;
   a pixel electrode disposed in the pixel region, the pixel electrode comprising a first pixel electrode in the transmission region and a second pixel electrode in the reflective region that is arranged in a same layer as the first pixel electrode
   wherein the blue phase liquid crystal panel has a single cell gap, at least one of the common electrode and the pixel electrode comprises a plurality of stripe-shaped electrodes, and with power being supplied, the first data line and the second data line apply different voltages to the first pixel electrode and the second pixel electrode respectively, such that a voltage difference between the first pixel electrode and the common electrode is greater than that between the second pixel electrode and the common electrode in the same pixel region, and the light for display in the transmission region and the light for display in the reflection region generate the same phase retardation after passing through the blue phase liquid crystal layer.

2. The blue phase liquid crystal panel according to claim 1, further comprising:
   a first quarter wave plate, a first half wave plate, and a first polarizer disposed on an outer side of the first substrate; and
   a second quarter wave plate, a second half wave plate and a second polarizer disposed on an outer side of the second substrate.

3. The blue phase liquid crystal panel according to claim 1, wherein the first data line and the second data line are disposed respectively on two sides of the pixel region.

4. The blue phase liquid crystal panel according to claim 1, wherein in the reflection region, a reflective layer is disposed on the inner side of the first substrate; and an insulating layer is disposed on the reflective layer, the insulating layer extending in both the transmission region and the reflection region.

5. The blue phase liquid crystal panel according to claim 4, wherein a thickness of the insulating layer in the transmission region is greater than a thickness of the insulating layer in the reflection region, and difference between the thicknesses of the insulating layer in the two regions is equal to the thickness of the reflective layer.

6. The blue phase liquid crystal panel according to claim 1, wherein the common electrode and the pixel electrode are disposed in a same layer and both comprise stripe-shaped electrodes, and a distance between adjacent stripe-shaped electrodes in the transmission regions is equal to a distance between the adjacent stripe-shaped electrodes in the reflection regions in the same layer,
   the stripe-shaped electrodes of the first pixel electrode and the stripe-shaped electrodes of the common electrode in the transmission region are arranged at intervals, and the stripe-shaped electrodes of the second pixel electrode and the stripe-shaped electrodes of the common electrode in the reflection region are arranged at intervals.

7. The blue phase liquid crystal panel according to claim 1, wherein the common electrode and the pixel electrode are disposed in different layers,
   one of the common electrode and the pixel electrode that is in an upper layer comprises a plurality of stripe-shaped electrode, and the other that is in a lower layer is a planar electrode; or, both of the common electrode and the pixel electrode comprise a plurality of stripe-shaped electrodes; and
   a distance between adjacent stripe-shaped electrodes in the transmission regions is equal to a distance between the adjacent stripe-shaped electrodes in the reflection regions in the same layer.

8. A display device, comprising a blue phase liquid crystal panel according to claim 1.

* * * * *